United States Patent
Marshall et al.

(10) Patent No.: US 7,535,185 B2
(45) Date of Patent: *May 19, 2009

(54) METHOD AND SYSTEM FOR IMPLEMENTING POWER REDUCTION ALGORITHMS IN A NIGHT VISION SYSTEM POWER SYSTEM

(75) Inventors: Paul Neil Marshall, Avon, CT (US); Craig Boucher, Simsbury, CT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 562 days.

This patent is subject to a terminal disclaimer.

(21) Appl. No.: 11/259,463

(22) Filed: Oct. 26, 2005

(65) Prior Publication Data

US 2008/0001084 A1 Jan. 3, 2008

(51) Int. Cl.
*H05B 37/02* (2006.01)

(52) U.S. Cl. .................................. 315/307; 250/214 VT

(58) Field of Classification Search ................. 315/291, 315/307, 308.361; 250/214 VT, 214 R; 359/407, 359/409, 815
See application file for complete search history.

(56) References Cited

U.S. PATENT DOCUMENTS

| | | | |
|---|---|---|---|
| 4,755,725 A * | 7/1988 | Kastendieck et al. ......... 315/360 |
| 4,918,314 A | 4/1990 | Sonne | |
| 4,924,080 A | 5/1990 | Caserta et al. ......... 250/213 VT |
| 4,994,950 A | 2/1991 | Gritter | |
| 5,699,236 A * | 12/1997 | Choi ........................... 363/15 |
| 5,883,381 A * | 3/1999 | Saldana ................. 250/214 VT |
| 6,087,660 A * | 7/2000 | Morris et al. ................ 250/330 |
| 6,140,574 A | 10/2000 | Snyder ..................... 174/35 R |
| 7,248,001 B2 * | 7/2007 | Marshall et al. ............. 315/307 |
| 7,301,147 B2 * | 11/2007 | Marshall et al. ............. 250/330 |
| 2004/0211896 A1 | 10/2004 | Laprade et al. | |
| 2005/0171431 A1 | 8/2005 | Petersen | |

OTHER PUBLICATIONS

International Search Report, PCT/US 06/35339, Jul. 18, 2008.

* cited by examiner

*Primary Examiner*—Douglas W Owens
*Assistant Examiner*—Jimmy T Vu
(74) *Attorney, Agent, or Firm*—Cantor Colburn LLP

(57) ABSTRACT

A night vision system comprising a power system having a low voltage unit coupled to a high voltage unit. The low voltage unit includes a low voltage controller and a low voltage table correlating step values to pulse widths, the low voltage controller obtaining a desired pulse width and accessing the table to obtain a step value. The low voltage unit transmits the step value to the high voltage unit using a pulse count modulation format. The high voltage unit includes an opto-isolator for receiving the step value from the low voltage controller and a high voltage controller demodulating the step value. In response to the step value, the high voltage controller accesses a high voltage table correlating step values to pulse width to obtain a pulse width, the high voltage controller generating a control pulse in response to the pulse width.

12 Claims, 2 Drawing Sheets

METHOD AND SYSTEM FOR IMPLEMENTING POWER REDUCTION ALGORITHMS IN A NIGHT VISION SYSTEM POWER SYSTEM

BACKGROUND OF THE INVENTION

Night vision systems are used in a number of applications, including military, industrial, commercial, etc. In general, the systems operate by multiplying light received at an image intensifier tube to generate a visible image. Power conservation is typically an issue with personal night vision systems that are powered by portable, battery supplies. Thus, it is beneficial to incorporate power conservation features in the night vision system in order to extend the operation of the night vision system.

BRIEF SUMMARY OF THE INVENTION

An embodiment of the invention a night vision system comprising a power system having a low voltage unit coupled to a high voltage unit. The low voltage unit includes a low voltage controller and a low voltage table correlating step values to pulse widths, the low voltage controller obtaining a desired pulse width and accessing the table to obtain a step value. The low voltage unit transmits the step value to the high voltage unit using a pulse count modulation format. The high voltage unit includes an opto-isolator for receiving the step value from the low voltage controller and a high voltage controller demodulating the step value. In response to the step value, the high voltage controller accesses a high voltage table correlating step values to pulse width to obtain a pulse width, the high voltage controller generating a control pulse in response to the pulse width.

Another embodiment of the invention is a method for controlling a night vision system. The method includes, in a low voltage unit, obtaining a desired pulse width and accessing a low voltage table to obtain a step value. The low voltage unit transmits the step value to the high voltage unit using a pulse count modulation format. In the high voltage unit, accessing a high voltage table correlating step values to pulse width to obtain a pulse width, the high voltage unit generating a control pulse in response to the pulse width.

DETAILED DESCRIPTION

Figure 1:
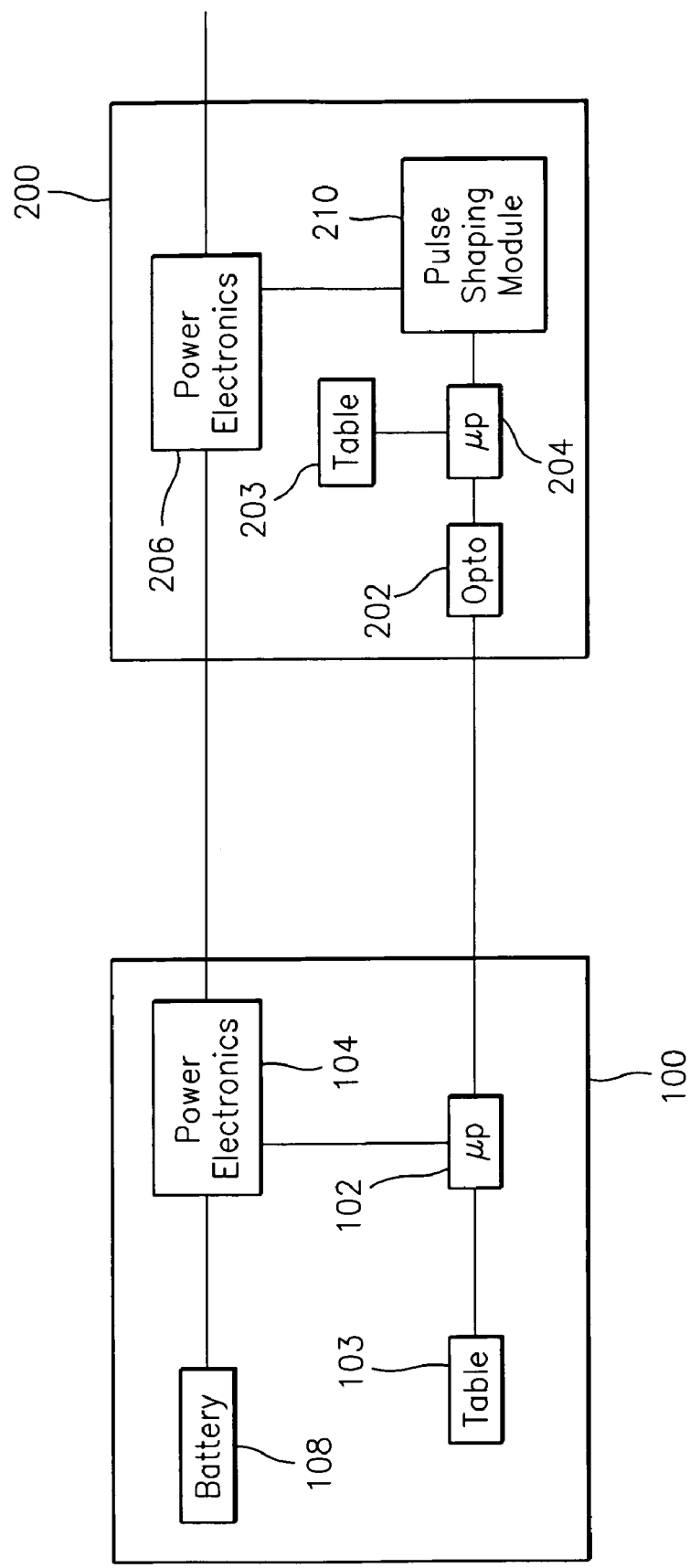
FIG. 1 is a block diagram of power components of a night vision system in exemplary embodiments.

FIG. 1 is a block diagram of power components of a night vision system in exemplary embodiments. The power components include a low voltage unit 100 and a high voltage unit 200. The low voltage unit 100 and the high voltage unit 200 operate with a significant volt FIG. 1 is a block diagram of power components of a night vision system in exemplary embodiments. The power components include a low voltage unit 100 and a high voltage unit 200. The low voltage unit 100 and the high voltage unit 200 operate with a significant voltage potential difference between them. The low voltage unit 100 includes a low voltage controller 102 in communication with low voltage electronics 104 and an opto-isolator 202 in the high voltage unit 200. The low voltage electronics 104 may include amplifiers, inverters, transformers, etc. A battery 108 is coupled to the low voltage electronics 104 to provide power to the high voltage unit 200.

The low voltage controller 102 may be a general-purpose microprocessor executing a computer code contained on a storage medium. Alternatively, the low voltage controller 102 may be implemented using a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of processes in embodiments of the invention.

The low voltage controller 102 interfaces with a low voltage table 103 to retrieve a step value that is transmitted to the high voltage unit as described in further detail herein. Low voltage table 103 may be a look-up table through which the low power controller 102 obtains a step value based on a desired pulse width. Low voltage table 103 may be stored in memory located in low power controller 102 or a separate device accessible by low power controller 102.

The opto-isolator 202 serves as an optically isolated one-way data link used to transfer information from the low voltage unit 100 to the high voltage unit 200. One of the information items is a step value, which corresponds to a desired pulse width. The step value represents the desired pulse width to be used in the high voltage unit and is obtained from low voltage table 103 as described in further detail herein. In an exemplary embodiment, the step value is an N-bit digital word representing the desired pulse width. Once the step value is received by the high voltage unit 200, the high voltage unit 200 generates a control pulse with a duration between 1250 μs and 300 ns by accessing high voltage table 203 with the step value. The opto-isolator 202 receives the step value and provides the step value to the high voltage controller 204. The high voltage controller 204 uses the step value to interface with pulse shaping module 210 to control high voltage power electronics 206 that bias the night vision system.

The high voltage controller 204 interfaces with high voltage table 203 to retrieve a pulse width in response to the step value transmitted from the low voltage unit 100. High voltage table 203 may be a look-up table through which the high power controller 204 obtains a pulse width based on the received step value. High voltage table 203 may be stored in memory located in high power controller 204 or a separate device accessible by high power controller 204.

A conventional method of defining a pulse width is to create a digital word where each count equals the minimum resolution. In power system of FIG. 1 with a minimum pulse resolution of 1 ns and a maximum value of 1250 μs, a digital word scaled at 1 count=1 ns would need to be capable of storing 1,250,000 counts to accommodate the desired resolution and maximum range. This requires a 21 bit digital word to represent 1,250,000 counts.

As noted above, a constraint of the night vision power system is power consumption. Sending 21 data bits drives up system power due to the energy required to drive the opto-transmitter for that many bits as well as the real-time power consumption need during the data transmission and reception.

As described above, the low voltage unit accesses low voltage table 103 to obtain a step value corresponding to a desired pulse width. The step value uses a reduced number of bits to communicate the pulse width. Exemplary step values and pulse widths are shown in Table 1. The pulse values start at the maximum, e.g., 1250 μs and go down by a percentage (e.g., 2.5%) in each step. A total of 336 steps are defined from 0 to 335 corresponding to pulse widths from 1250 μs to 319 ns.

TABLE 1

Pulse Widths

| Step | Pulse Width |
|---|---|
| 0 | 1250.000 μs |
| 1 | 1219.512 μs |
| 2 | 1189.768 μs |
| . | . |
| . | . |
| . | . |
| 333 | 0.336 μs |
| 334 | 0.327 μs |
| 335 | 0.319 μs |

In operation, the low voltage controller 102 determines the desired pulse width and accesses low voltage table 103 to determine the appropriate step value. The low voltage unit 100 sends a digital word representing the step value by accessing low voltage table 103 indexing the desired pulse width to the step value. Accordingly, instead of sending the pulse width value across the data link, a step value from Table 1 is sent. Using this method, the data transmitted across the data link need only be 10 bits as opposed to 21 bits if the pulse width value is sent. Nine bits are used to send the step value and a tenth bit may be included as steering bit to direct the 9 bit word to the appropriate high power circuitry. The power electronics 206 include circuitry for controlling both DC levels and voltage gating on the night vision MCP. Sending 10 bits results in a 2× power reduction and transmission time reduction as compared to sending 21 bits.

The low voltage controller 102 sends the step value to the high voltage controller 204 through opto-isolator 202. The high voltage controller 204 accesses high voltage table 203, which is a local copy of low voltage table 103, and determines the pulse width corresponding to the received step value. The high voltage controller 202 causes this pulse width to be produced though pulse shaping module 210, which in-turn drives high voltage electronics 206 through a control pulse. For example, the high voltage electronics 206 may include a digital to analog converter and several analog output functions, all of which reside in the high voltage block.

This communication protocol uses less power and communication time than standard digital communication protocols. Using tables 103 and 203 provides fast, low power operation. The use of a correlation table based upon a 2.5% change between steps results in a logarithmic scaling relationship between inputs to output.

Further power reduction mechanisms may be used to reduce power consumption of the night vision system. One power reduction technique includes reducing the data transmitted between the low voltage unit 100 and the high voltage unit 200. Using opto-isolator 202 for data transmission consumes a significant amount of power when powered. Reducing the amount of data transmitted will result in a reduction in power consumption. As discussed above, logarithmic scaling of the pulse width data minimizes the number of bits transmitted. In addition, the data modulation format for the data transmission can also have a significant impact on power consumption. Embodiments of the invention use data modulation techniques to address power consumption. One feature of the modulation technique is keeping the on-time of the opto-isolator to a minimum resulting in the minimum power consumption. Another feature of the modulation technique is to send the data at the highest rate possible to minimize the total transmission time and therefore the power consumption in the transmitting and receiving controllers.

Figure 2:
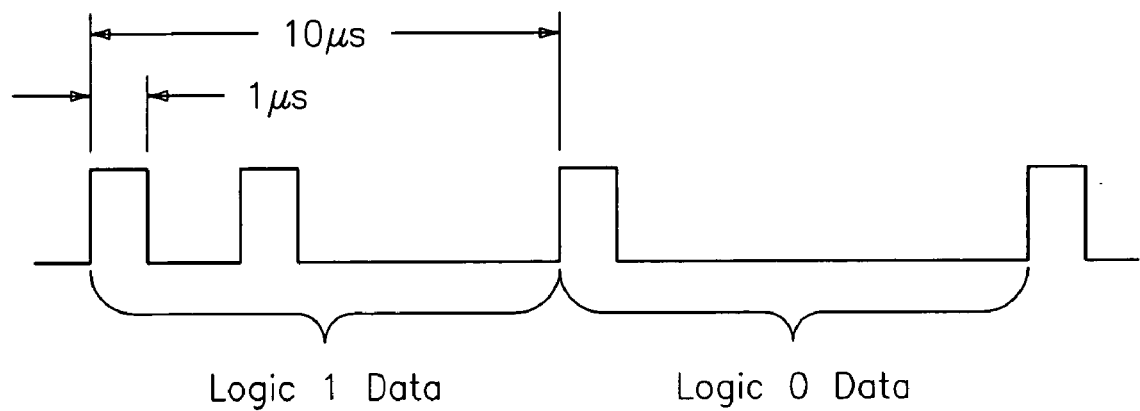
FIG. 2 illustrates an exemplary modulation scheme used in the night vision system.

A modulation technique which uses the shortest pulses possible will result in minimal power consumption. Since the high voltage controller 204 demodulates the data in real-time, a format which is easy to demodulate will also result in reduced power consumption. Embodiments of the invention use a modulation format of pulse count modulation where 0.5 μs pulses are sent at a base rate of 100 kHz with pulses added for logic one states as shown in FIG. 2. This implementation satisfies the two conditions of minimal opto isolator on-time (0.5 μs pulses are used) while providing a simple and fast demodulation.

Another technique used to reduce power consumption is controller downclocking. The high voltage controller 204 has the ability to reduce its clock speed and therefore it power consumption. The system is designed so that each sub-system executes for a portion of the timing period and then reduces its power for the remaining time. For example, for a 1 kHz cycle, the required tasks consume 600 μs of the available 1000 μs. For the remaining 400 μs, the high voltage controller 204 downclocks and reduces its power. At the end of the 400 μs time, the high voltage controller 204 upclocks and resumes operation.

Another technique used to reduce power consumption is to configure the high voltage controller 204 at the receiving end of the optical data link being slaved to the low voltage controller 102. Embodiments of the invention provide the ability to idle the system to conserve power. A feedback voltage, $V_0$, from the night vision system MCP is provided to the low power unit 100. When this feedback voltage, $V_0$, is approximately zero volts, the night vision system runs at full gain, the control pulses in high voltage unit 200 are static and step values are not needed from the low voltage unit 100 to the high voltage unit 200. When the power system is at idle, the control pulses establish an MCP voltage at zero or close to zero volts. For these values of $V_0$, the voltages and control pulses are static for the high voltage unit 200 at the receiving end of the optical data link. Effective power consumption reduction is achieved when operating in this region of $V_0$ by stopping transmission on the optical data link between the low voltage unit 100 and the high voltage unit 200.

The receiving high voltage unit 200 is designed to leave its outputs at the last value if data reception at the opto isolator 202 ceases. Thus, halting the data transmission from the low voltage unit 100 idles the high voltage unit 200 with its outputs in the correct state. Idling reduces the high voltage unit 200 power consumption to about 20% of its nominal power consumption. With about equal power consumption in both the low and high voltage units, the system idling reduces the overall system power consumption by about 40%.

As described above, the embodiments of the invention may be embodied in the form of processor-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A night vision system comprising:
   a power system having a low voltage unit coupled to a high voltage unit;
   the low voltage unit including a low voltage controller and a low voltage table correlating step values to pulse widths, the low voltage controller obtaining a desired pulse width and accessing the table to obtain a step value;
   the low voltage unit transmitting the step value to the high voltage unit using a pulse count modulation format;
   the high voltage unit including an opto-isolator for receiving the step value from the low voltage controller, a high voltage controller demodulating the step value and in response to the step value accessing a high voltage table correlating step values to pulse width to obtain a pulse width, the high voltage controller generating a control pulse in response to the pulse width.

2. The night vision system of claim 1 wherein:
   the pulse count modulation format includes pulses sent at a predefined frequency, with pulses inserted to represent a logic one state.

3. The night vision system of claim 1 wherein:
   the high voltage controller reduces its clock speed during inactive periods.

4. The night vision system of claim 1 wherein:
   the high voltage controller maintains the control pulse at a steady value when transmission from the low voltage unit to the opto isolator is interrupted.

5. The night vision system of claim 1 wherein:
   the step value corresponds to pulse widths ranging from a maximum value and decreasing logarithmically to a minimum value.

6. The night vision system of claim 5 wherein:
   the pulse widths decrease from the maximum value to the minimum value in decrements of 2.5%.

7. A method for controlling a night vision system, the method comprising:
   in a low voltage unit, obtaining a desired pulse width and accessing a low voltage table to obtain a step value;
   the low voltage unit transmitting the step value to the high voltage unit using a pulse count modulation format;
   in the high voltage unit, accessing a high voltage table correlating step values to pulse width to obtain a pulse width, the high voltage unit generating a control pulse in response to the pulse width.

8. The method of claim 7 wherein:
   the pulse count modulation format includes pulses sent at a predefined frequency, with pulses inserted to represent a logic one state.

9. The method of claim 7 wherein:
   the high voltage controller reduces its clock speed during inactive periods.

10. The method of claim 7 wherein:
    the high voltage controller maintains the control pulse at a steady value when transmission from the low voltage unit to the opto isolator is interrupted.

11. The method of claim 7 wherein:
    the step value corresponds to pulse widths ranging from a maximum value and decreasing logarithmically to a minimum value.

12. The method of claim 11 wherein:
    the pulse widths decrease from the maximum value to the minimum value in decrements of 2.5%.

* * * * *